United States Patent
Jang et al.

(10) Patent No.: US 11,234,003 B2
(45) Date of Patent: Jan. 25, 2022

(54) METHOD AND APPARATUS FOR INTRA-PREDICTION IN IMAGE CODING SYSTEM

(71) Applicant: LG ELECTRONICS INC., Seoul (KR)

(72) Inventors: Hyeongmoon Jang, Seoul (KR); Naeri Park, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 535 days.

(21) Appl. No.: 16/319,637

(22) PCT Filed: Jul. 26, 2016

(86) PCT No.: PCT/KR2016/008134
§ 371 (c)(1),
(2) Date: Jan. 22, 2019

(87) PCT Pub. No.: WO2018/021585
PCT Pub. Date: Feb. 1, 2018

(65) Prior Publication Data
US 2021/0297677 A1 Sep. 23, 2021

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/105* (2014.11); *H04N 19/176* (2014.11);
(Continued)

(58) Field of Classification Search
CPC .. H04N 19/159; H04N 19/176; H04N 19/105; H04N 19/70; H04N 19/593; H04N 19/107; H04N 19/91
(Continued)

(56) References Cited

U.S. PATENT DOCUMENTS

2010/0246672 A1 9/2010 Gharavi-Alkhansari et al.
2011/0261882 A1* 10/2011 Zheng ................... H04N 19/46
375/240.13
(Continued)

FOREIGN PATENT DOCUMENTS

KR 10-2011-0009141 A 1/2011
KR 10-2011-0062748 A 6/2011
(Continued)

*Primary Examiner* — Matthew K Kwan
(74) *Attorney, Agent, or Firm* — Dentons US LLP

(57) ABSTRACT

An intra-prediction method according to the present invention comprises the steps of: acquiring intra-prediction mode information from a bitstream; deriving neighboring reference samples of a current block; determining an intra-directional mode for the current block; deriving a predicted block for the current block based on the intra-directional mode and the neighboring reference samples; deriving template reference samples based on the neighboring reference samples; a template reference block based on the template reference samples; and generating a modified predicted block based on the predicted block and the template reference block. The present invention can generate a modified predicted block based on an intra-predicted block and a template reference block, thereby improving the intra-prediction performance.

12 Claims, 19 Drawing Sheets

(51) Int. Cl.
*H04N 19/105* (2014.01)
*H04N 19/70* (2014.01)
*H04N 19/593* (2014.01)
H04N 19/107 (2014.01)
H04N 19/91 (2014.01)

(52) U.S. Cl.
CPC ........... *H04N 19/593* (2014.11); *H04N 19/70* (2014.11); *H04N 19/107* (2014.11); *H04N 19/91* (2014.11)

(58) Field of Classification Search
USPC .................................................. 375/240.12
See application file for complete search history.

(56) References Cited

U.S. PATENT DOCUMENTS

2012/0288002 A1\* 11/2012 Shin .................. H04N 19/51
   375/240.16
2017/0134726 A1\* 5/2017 Sim .................. H04N 19/11
2019/0230350 A1\* 7/2019 Chen .................. H04N 19/573

FOREIGN PATENT DOCUMENTS

KR 10-2012-0049435 A 5/2012
WO 2015152507 A 10/2015

\* cited by examiner

FIG. 8

$$Pred_{new}^{D} = W \times A + (1-W) \times Pred_{Dir(cur)}^{D}$$

$$\boxed{Pred^D_{new}}_{1050} = W \times \boxed{Rec^T}_{1030} + (1-W) \times \boxed{Pred^D_{Dir(cur)}}_{1060}$$

FIG. 12

$$\text{Pred}^D_{new} = W \times \text{Pred}^T_{Dir(x)} + (1-W) \times \text{Pred}^D_{Dir(cur)}$$

1250     1230     1260

METHOD AND APPARATUS FOR INTRA-PREDICTION IN IMAGE CODING SYSTEM

CROSS-REFERENCE TO RELATED APPLICATIONS

This application is the National Stage filing under 35 U.S.C. 371 of International Application No. PCT/KR2016/008134, filed on Jul. 26, 2016, the contents of which are all hereby incorporated by reference herein in their entirety.

BACKGROUND OF THE INVENTION

Field of the Invention

The present invention relates to a video coding technique and, more specifically, to an intra-prediction method and apparatus in a video coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

An object of the present invention is to provide a method and apparatus for improving intra-prediction efficiency.

Another object of the present invention is to provide a method and apparatus for combining a conventional intra-prediction method and a template based intra-prediction method.

Another object of the present invention is to provide a method and apparatus for deriving template reference samples similar to neighboring reference samples of a current block.

Another object of the present invention is to provide a method and apparatus for generating a template predicted block based on template reference samples.

Another object of the present invention is to provide a method and apparatus for combining a predicted block in an intra-prediction mode and a template predicted block according to a weight.

Another object of the present invention is to provide a method and apparatus for determining a weight between a predicted block in an intra-prediction mode and a template predicted block.

Another object of the present invention is to provide an intra-prediction method and apparatus for cases in which a region derived through template matching and a region of a current block overlap.

According to an embodiment of the present invention, an intra-prediction method performed by a decoding apparatus is provided. The intra-prediction method includes acquiring intra-prediction mode information from a bitstream, deriving neighboring reference samples of a current block, determining an intra-directional mode for the current block based on the intra-prediction mode information, deriving a predicted block for the current block based on the intra-directional mode and the neighboring reference samples, deriving template reference samples based on the neighboring reference samples, deriving a template reference block based on the template reference samples, and generating a modified predicted block based on the predicted block and the template reference block.

According to another embodiment of the present invention, an intra-prediction method performed by an encoding apparatus is provided. The intra-prediction method includes deriving neighboring reference samples of a current block, determining an intra-directional mode for the current block, deriving a predicted block for the current block based on the intra-directional mode and the neighboring reference samples, deriving template reference samples based on the neighboring reference samples, deriving a template reference block based on the template reference samples, generating a modified predicted block based on the predicted block and the template reference block, and encoding intra-prediction mode information representing the intra-directional mode for the current block and outputting the intra-prediction mode information.

According to another embodiment of the present invention, a decoding apparatus that performs intra-prediction is provided. The decoding apparatus includes an entropy decoder that acquires intra-prediction mode information from a bitstream and a predictor that derives neighboring reference samples of a current block, determines an intra-directional mode for the current block based on the intra-prediction mode information, derives a predicted block for the current block based on the intra-directional mode and the neighboring reference samples, derives template reference samples based on the neighboring reference samples, derives a template reference block based on the template reference samples and generates a modified predicted block based on the predicted block and the template reference block.

According to another embodiment of the present invention, an encoding apparatus that performs intra-prediction is provided. The encoding apparatus includes a predictor that derives neighboring reference samples of a current block, determines an intra-directional mode for the current block, derives a predicted block for the current block based on the intra-directional mode and the neighboring reference samples, derives template reference samples based on the neighboring reference samples, derives a template reference block based on the template reference samples and generates a modified predicted block based on the predicted block and the template reference block, and an entropy encoder that encodes intra-prediction mode information representing the intra-directional mode for the current block and outputs the intra-prediction mode information.

According to the present invention, it is possible to generate a modified predicted block based on an intra-predicted block and a template reference block to improve intra-prediction performance.

According to the present invention, it is possible to adaptively determine a weight between an intra-predicted block and a template reference block based on comparison between an intra-directional mode of a template predicted block and an intra-directional mode of a current block.

In addition, according to the present invention, it is possible to improve intra-prediction performance while minimizing additional auxiliary information transmission to enhance coding efficiency.

BRIEF DESCRIPTION OF THE DRAWINGS

FIG. 8 illustrates an example of an enhanced predicted block generation method based on a weighted sum.

FIG. 10 illustrates an enhanced predicted block generation method based on a weighted sum according to an embodiment of the present invention.

FIG. 12 illustrates an enhanced predicted block generation method based on a weighted sum according to another embodiment of the present invention.

DESCRIPTION OF EXEMPLARY EMBODIMENTS

Figure 1:
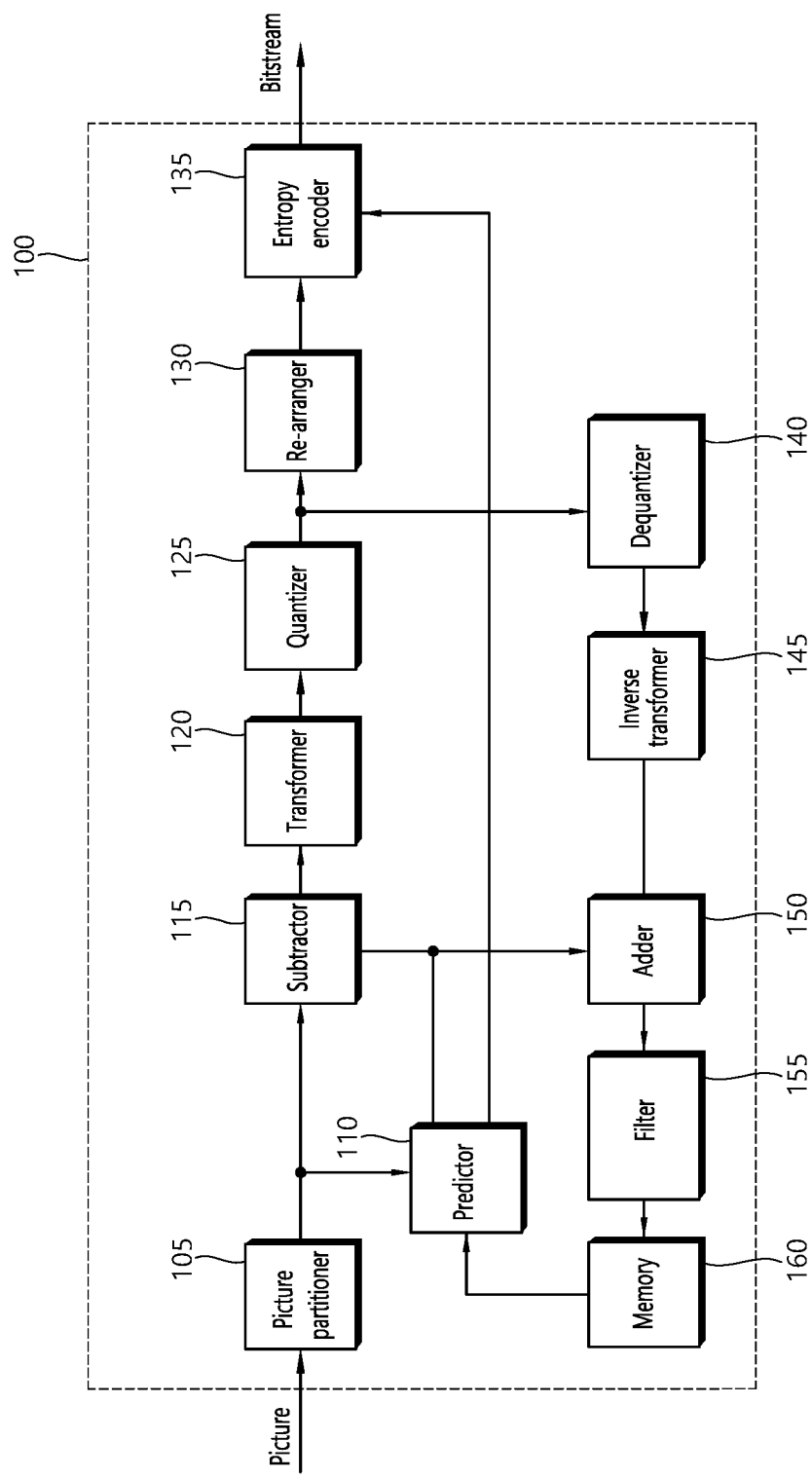
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
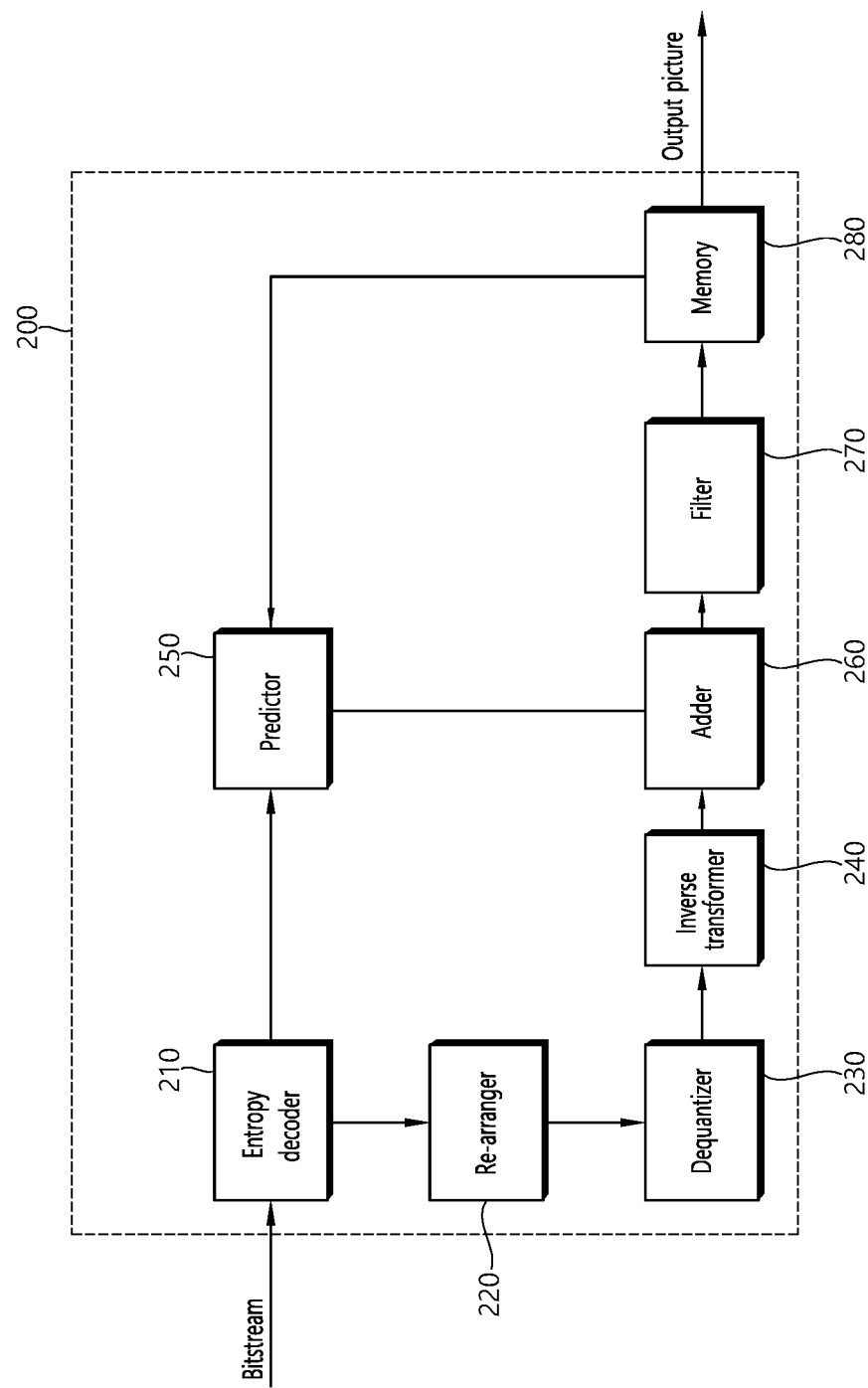
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device.

Although the re-arranger 220 is described as a separate component, the re-arranger 220 may be a part of the quantizer 230.

The dequantizer 230 may de-quantize the quantized transform coefficients based on a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block based on a neighboring reference sample in a current picture. The predictor 250 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a prediction sample for a current block based on a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

When an image or video is coded, intra-prediction or inter-prediction can be applied, as described above, for coding efficiency. When intra-prediction is applied, neighboring samples of a current block in a current picture can be used as reference samples for the current block. In this case, predicted samples of the current block can be derived based on the neighboring reference samples according to an intra-prediction mode of the current block. An encoding apparatus can determine the intra-prediction mode based on rate-distortion optimization (RDO) and signal related information to a decoding apparatus.

For example, the intra-prediction mode can include 35 prediction mode as follows.

TABLE 1

| Intra-prediction mode | Associated name |
|---|---|
| 0 | Intra-planar |
| 1 | Intra-DC |
| 2 . . . 34 | Intra-angular 2, . . . , intra-angular 34 |

Here, intra-prediction mode #0 represents an intra-planar mode and intra-prediction mode #1 represents an intra-DC mode. Intra-prediction modes #2 to #34 represent intra-angular 2 mode to intra-angular 34 mode.

Here, the intra-planar mode and the intra-DC mode may be called an intra-non-directional mode and the intra-angular 2 to intra-angular 34 modes may be called an intra-directional mode.

Figure 3:
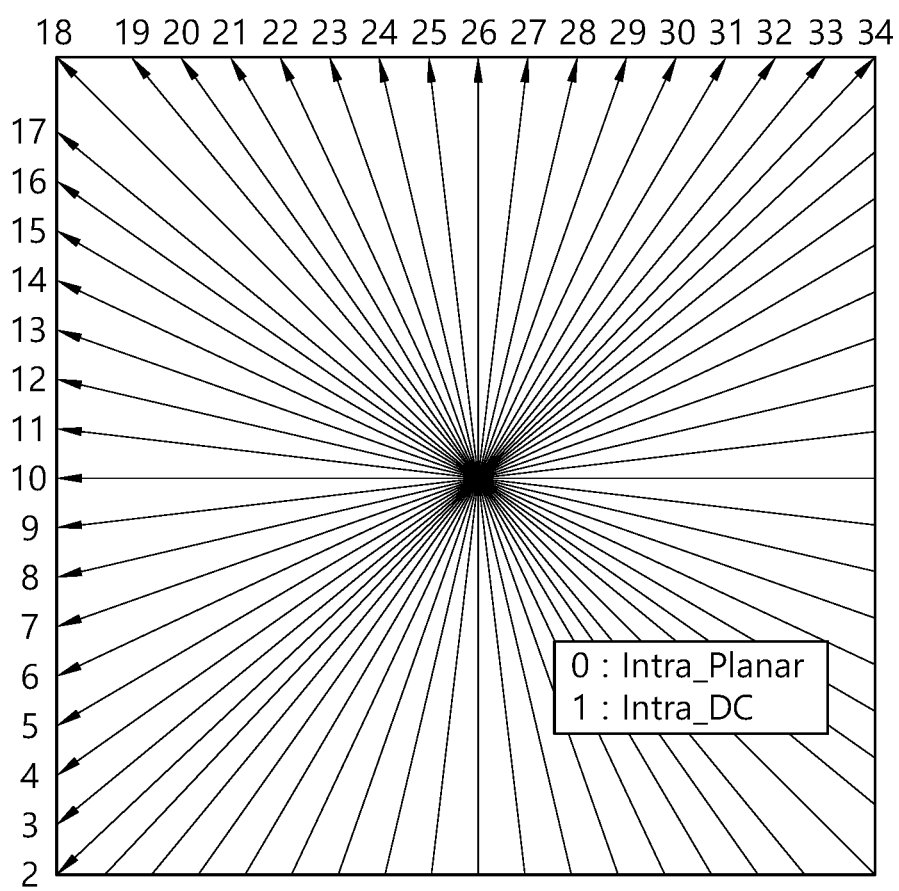
FIG. 3 illustrates intra-prediction modes according to the present invention.

FIG. 3 illustrates intra-prediction modes according to the present invention.

Referring to FIG. 3, intra-prediction modes #0 and #1 do not have directivity, and predicted samples can be derived based on bidirectional interpolation of neighboring samples or an average of neighboring samples in intra-prediction modes #0 and #1. Intra-prediction modes #2 to #34 have directivity as shown, and a predicted sample can be derived based on neighboring reference samples positioned in a corresponding prediction direction based on the position of the predicted sample. In this case, when a neighboring sample in unit of integer sample is not present at the position of the corresponding prediction direction, a fractional sample may be generated through interpolation of two integer samples neighboring in the corresponding direction and the predicted sample may be derived based on the fractional sample.

However, when intra-prediction is performed on the current block only based on an intra-prediction mode and neighboring reference samples, error to some degree must be generated to cause an increase in the quantity of data with respect to a residual signal, decreasing coding efficiency.

When intra-prediction is performed according to the present invention, it is possible generate a predicted block (hereinafter referred to as an intra-directional predicted block) through a conventional intra-prediction mode, generate a reference block (which may be referred to as a template reference block) through template matching and generate an enhanced (modified) predicted block based on the predicted block and the reference block. This may be called an intra-combine prediction mode or a combine prediction mode. According to this prediction mode, intra-prediction accuracy can be improved to compress images more efficiently. Here, a predicted block may represent a set of predicted samples.

First, a method of generating a template reference block based on an already decoded region in a current picture using template matching is proposed.

Template matching is a technique of detecting a reference template most similar to a target template in an already decoded region (or already reconstructed region) of the current picture using neighboring reference samples of the current block as the target template and generating a reference block based on the reference template. In this case, the reference block can be generated based on a corresponding region surrounded by the reference template. In this case, an encoding apparatus can signal information for representing a positional relationship between the target template and the reference template (e.g., position vector or position information) to a decoding apparatus. Alternatively, the encoding apparatus and the decoding apparatus may detect the reference template through the same position estimation method without explicit information signaling in order to avoid bit overhead of the signaled information.

Figure 4:
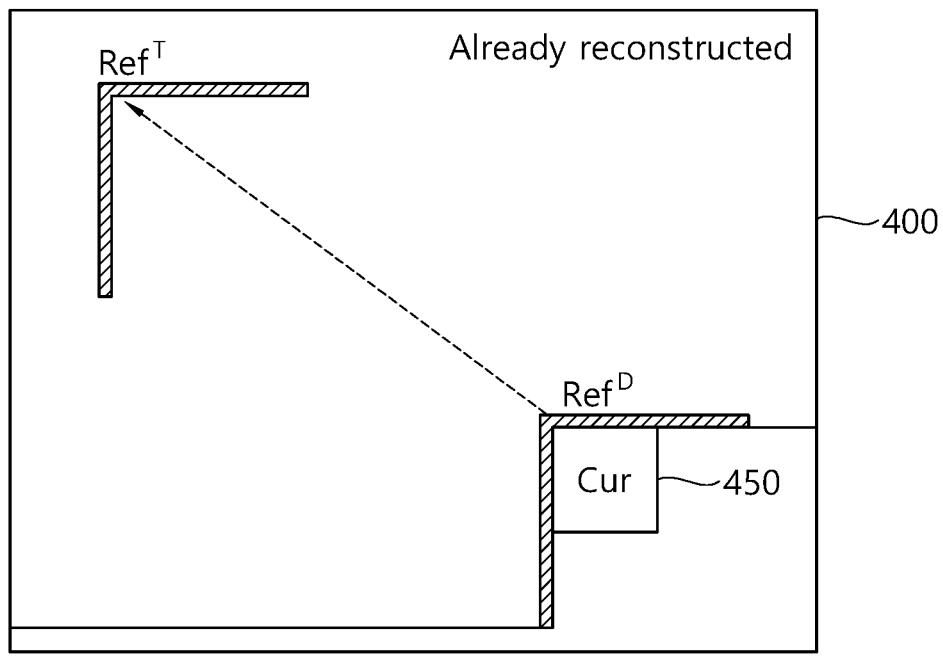
FIG. 4 illustrates a template matching method according to the present invention.

FIG. 4 illustrates a template matching method according to the present invention.

Referring to FIG. 4, a reconstructed region 400 represents an already decoded region and a current block 450 represents a target block that is currently decoded. For intra-prediction of the current block 450, neighboring reference samples can be derived first.

For example, when a top-left sample position of the current block 450 is regarded as (0, 0), left neighboring samples p[−1][2N−1] . . . p[−1][0], a top-left neighboring sample p[−1][−1] and upper neighboring samples p[0][−1] . . . p[2N−1][−1] can be derived as neighboring reference samples for intra-prediction of the current block 450. Here, p[m][n] represents a sample (pixel) at a sample position (m, n) and this can indicate a relative sample position with respect to the top-left sample position (0, 0) of the current block 450. In addition, N represents the size of the current block 450. N can correspond to the width or height of the current block 450. When the current block 450 is a transform block, N may be represented as nTbS. If the width of the current block 450 is W and the height thereof is H, left neighboring samples p[−1][2H−1] . . . p[−1][0], top-left neighboring sample p[−1][−1] and upper neighboring samples p[0][−1] . . . p[2W−1][−1] may be derived as the neighboring reference samples.

Neighboring reference samples of the current block 450 may be represented by $Ref^D$ and can be used as the target template. In this case, the encoding/decoding apparatus detects template reference samples most similar to the neighboring reference samples $Ref^D$) within the reconstructed region or a specific region of the reconstructed region. The encoding/decoding apparatus detects template reference samples most similar to the neighboring reference samples $Ref^D$ by detecting portions having minimum errors with respect to the neighboring reference samples $Ref^D$ within the reconstructed region or the specific region of the reconstructed region. The template reference samples can be represented by $Ref^T$.

The encoding apparatus and the decoding apparatus may detect the template reference samples $Ref^T$ by using the same method. In this case, the template reference samples $Ref^T$ can be derived without additionally transmitting position information about the template reference samples $Ref^T$. In this case, in order to reduce the amount of calculations, only regions within a specific distance from the current block 450 or the neighboring reference samples $Ref^D$ may be regarded as search regions.

Thereafter, a predicted block can be generated based on the neighboring reference samples $Ref^D$ and a reference block can be generated based on the template reference samples $Ref^T$. An enhanced predicted block with respect to the current block 450 can be generated based on the predicted block and the reference block. In this case, the enhanced predicted block can be generated in consideration of a weight between the predicted block and the reference block.

Generation of the reference block and determination of a weight may be performed by a coding apparatus based on the following method. Hereinafter, the coding apparatus may include an encoding apparatus and/or a decoding apparatus.

(1) The coding apparatus generates one or more template predicted blocks with reference to the template reference samples $Ref^T$. For example, the coding apparatus can generate n template predicted blocks using n intra-directional modes. In this case, the n-th intra-directional mode may be represented as $predMode^T_{Dir(n)}$. Here, (n) corresponds to an index. In this case, the n-th secondary predicted block may be represented as $Pred^T_{Dir(n)}$.

Figure 5:
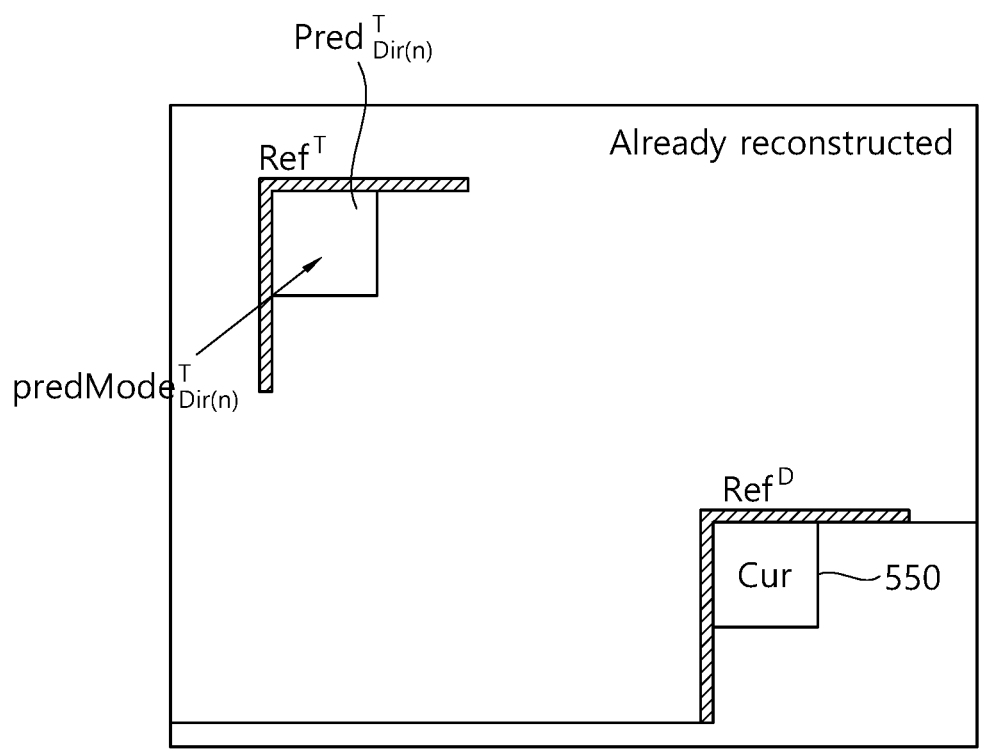
FIG. 5 illustrates an example of generating a template predicted block using template reference samples $Ref^T$.

FIG. 5 illustrates an example of generating a template predicted block using the template reference samples $Ref^T$.

Referring to FIG. 5, the coding apparatus can generate n template predicted blocks based on the template reference samples $Ref^T$. In this case, the coding apparatus can generate the n template predicted blocks using the template reference samples $Ref^T$ and n intra-directional modes. For example, the coding apparatus can generate $Pred^T_{Dir(1)}$ using $predMode^T_{Dir(1)}$, generate $Pred^T_{Dir(2)}$ using $predMode^T_{Dir(2)}$ and generate $Pred^T_{Dir(n)}$ using $predMode^T_{Dir(n)}$. In this case, the n intra-directional modes can be derived based on intra-prediction modes similar to the prediction direction of the intra-prediction mode of the current block 550, for example. For example, when the intra-prediction mode of the current block 550 is intra-prediction mode #k, the n intra-directional modes may include intra-prediction modes #k−m, . . . #k, . . . #k+m. Specifically, when the intra-prediction mode of the current block 550 is intra-prediction mode #10, for example, the n intra-directional modes may include intra-prediction modes #9, #10 and #11.

(2) The coding apparatus derives a reconstructed block (hereinafter referred to as a template reconstructed block) of a corresponding region surrounded by the template reference samples $Ref^T$, selects one of the template predicted blocks by comparing the template reconstructed block with the template predicted blocks and derives an intra-directional mode for the selected template predicted block.

The corresponding region is a region surrounded by the template reference samples $Ref^T$ and may have the same size as that of the current block. For example, when the template reference samples $Ref^T$ include p[x0−1][y0+2N−1], . . . , p[x0−1][y0],p [x0−1][y0−1], p[x0][y0−1], . . . ,p[x0+2N−1][y0−1], the corresponding region may be a region having a width N and a height N when the top-left sample position of the corresponding region is (x0, y0). When the template reference samples $Ref^T$ include p[x0−1][y0+2H−1], . . . ,p [x0−1][y0],p [x0−1][y0−1], p[x0][y0−1], . . . ,p[x0+2W−1][y0−1], the corresponding region may be a region having a width W and a height H and having a top-left sample position (x0, y0).

The template reconstructed block represents an already decoded block with respect to the corresponding region. That is, the template reconstructed block can represent a block including reconstructed samples for the corresponding region. The template reconstructed block may be represented by $Rec^T$.

A predicted block most similar to the template reconstructed block $Rec^T$ is selected from the n template predicted blocks. In other words, a predicted block having a minimum error with respect to the template reconstructed block $Rec^T$ is selected from the n template predicted blocks. That is, a predicted block having a smallest residual with respect to the template reconstructed block $Rec^T$ is selected from the n template predicted blocks. In this case, when a predicted block selected from the n template predicted blocks is $Pred^T_{Dir(x)}$, an intra-directional mode $predMode^T_{Dir(x)}$ for the selected template predicted block $Pred^T_{Dir(x)}$ is derived.

Figure 6:
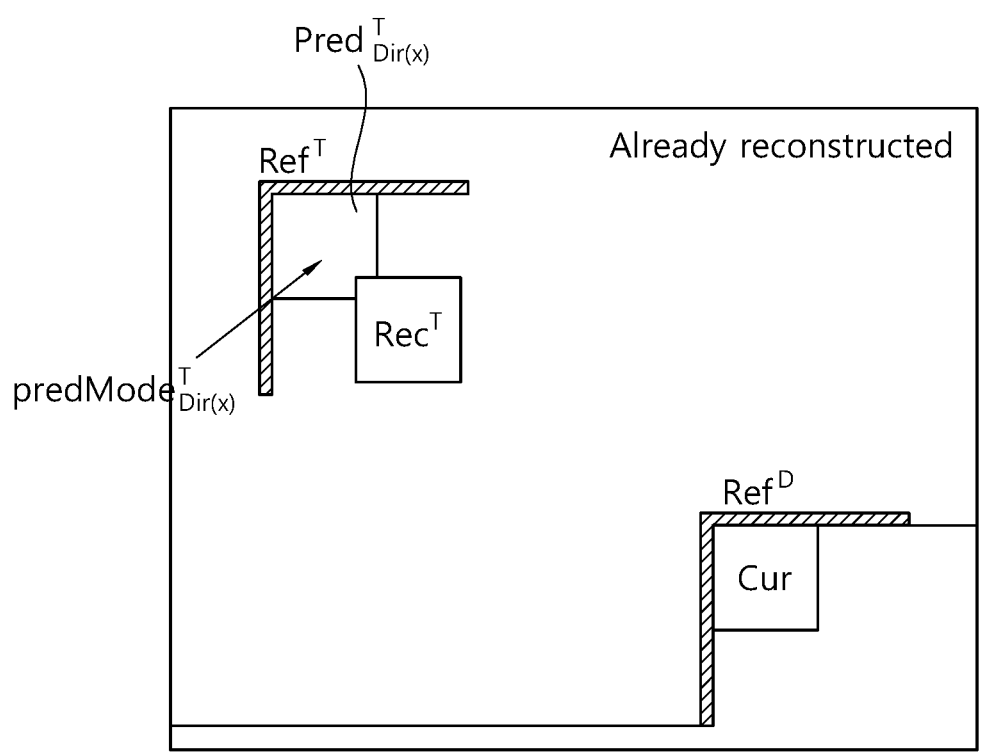
FIG. 6 illustrates an example of selecting a template predicted block $Pred^T_{Dir(x)}$ and deriving an intra-directional mode $predMode^T_{Dir(x)}$.

FIG. 6 illustrates an example of selecting a template predicted block $Pred^T_{Dir(x)}$ and an intra-directional mode $predMode^T_{Dir(x)}$.

Referring to FIG. 6, the coding apparatus compares the n template predicted blocks for the corresponding region with the template reconstructed block $Rec^T$, selects $Pred^T_{Dir(x)}$ that is one of the n template predicted blocks and derives an intra-directional mode $predMode^T_{Dir(x)}$ for $Pred^T_{Dir(x)}$. Here, the arrow indicates a prediction direction of $predMode^T_{Dir(x)}$.

Here, although the template reconstructed block $Rec^T$ is shown in an area other than the aforementioned corresponding region for comparative description, the template reconstructed block $Rec^T$ is also positioned in the corresponding region.

(3) The coding apparatus calculates a difference between the intra-directional mode of the current block and the derived intra-directional mode $predMode^T_{Dir(x)}$. That is, the coding apparatus calculates a difference between the index of the intra-directional mode of the current block and the index of the derived intra-directional mode $predMode^T_{Dir(x)}$. The intra-directional mode of the current block can be represented by $predMode^D_{dir(cur)}$ and the difference can be represented by $Diff^{Dir}$.

Figure 7:
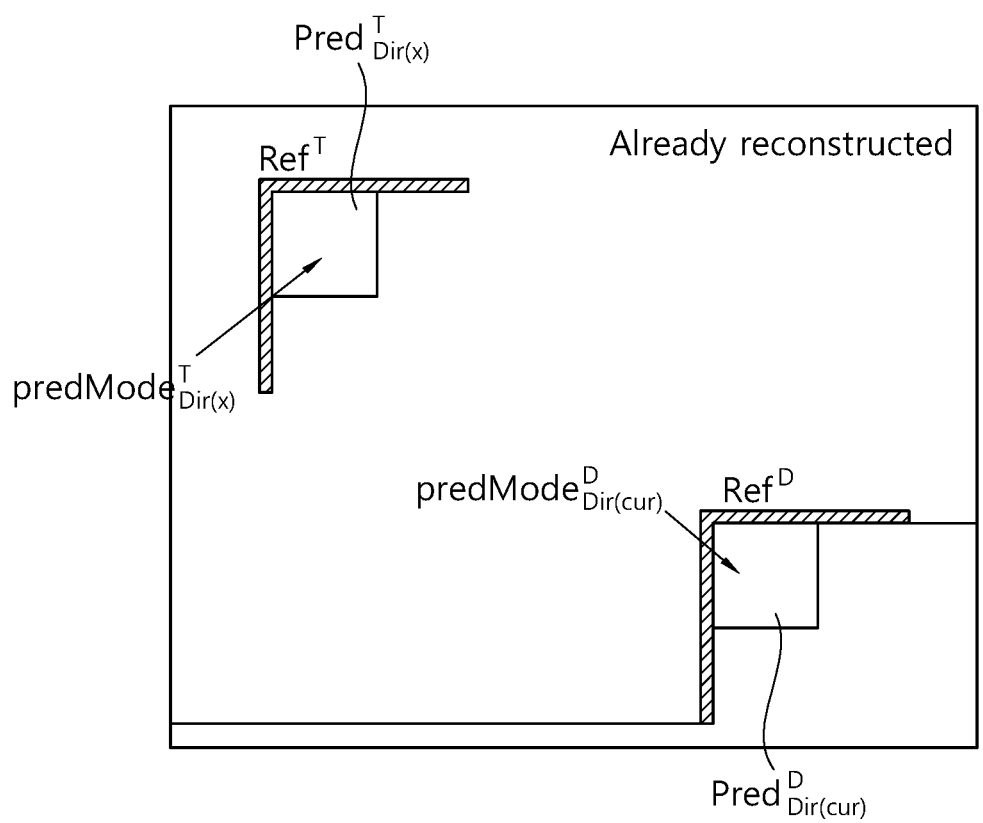
FIG. 7 illustrates an intra-directional mode $predMode^D_{dir(cur)}$ of an a current block and intra-directional mode $predMode^T_{Dir(x)}$ for the selected template predicted block $Pred^T_{Dir(x)}$.

FIG. 7 illustrates the intra-directional mode $predMode^D_{dir(cur)}$ of and the current block the intra-directional mode $predMode^T_{Dir(x)}$ for the selected template predicted block $Pred^T_{Dir(x)}$.

Referring to FIG. 7, $Pred^D_{Dir(cur)}$ is an (intra-directional) predicted block derived based on the intra-directional mode $predMode^D_{dir(cur)}$ of the current block and neighboring reference samples $Ref^D$, and $Pred^T_{Dir(x)}$ is a template predicted block derived and selected based on $predMode^T_{Dir(x)}$ and template reference samples $Ref^T$. The intra-directional mode $predMode^D_{dir(cur)}$ of the current block can be compared with the intra-directional mode $predMode^T_{Dir(x)}$ for the selected secondary predicted block $Pred^T_{Dir(x)}$ to calculate a mode value (index value) difference between $predModP^D_{dir(cur)}$ and $predMode^T_{Dir(x)}$. For example, when the intra-prediction mode $predMode^D_{dir(cur)}$ of the current block is intra-prediction mode #15 (i.e., index value 15) and the derived intra-directional mode $predMode^T_{Dir(x)}$ is intra-prediction mode #5 (i.e., index value 5), the difference $Diff^{Dir}$ between the two modes is 10.

(4) The coding apparatus determines a weight W based on the difference $Diff^{Dir}$. For example, the weight W can include values in the range of 0 to 1 (W∈[0~1]). The weight W may increase or decrease according to the difference $Diff^{Dir}$. For example, the weight W can increase as the difference $Diff^{Dir}$ decreases. The weight can be determined in an encoding apparatus, transmitted to a decoding apparatus and used as a default weight. Alternatively, when the weight is not transmitted, the encoding apparatus and the decoding apparatus may derive a weight corresponding to the difference $Diff^{Dir}$ using the difference $Diff^{Dir}$ and a weight range of 0 to 1. For example, when 33 intra-directional modes #2 to #34 except the planar mode and DC mode of intra-prediction modes #0 and #1 are considered, the range of difference $Diff^{Dir}$ which can be derived is 0 to 32 ($Diff^{Dir}$∈[0~32]). In this case, the weight W can be derived based on the following equation.

$$W = \frac{\frac{1}{2}}{Diff^{dir} + 1} \quad \text{[Equation 1]}$$

Alternatively, the difference $Diff^{Dir}$ may be categorized into several ranges and a weight corresponding to each category may be predefined. In this case, the weight W can be derived based on the following table, for example.

TABLE 2

| $Diff^{dir}$ | w |
|---|---|
| [0, 1, 2] | 0.5 |
| [3, 4, 5] | 0.45 |
| [6, 7, 8] | 0.4 |
| [9, 10, 11] | 0.35 |
| [12, 13, 14] | 0.3 |
| [15, 16, 17] | 0.25 |
| [18, 19, 20] | 0.2 |
| [21, 22, 23] | 0.15 |
| [24, 25, 26] | 0.1 |
| [27, 28, 29] | 0.05 |
| [30, 31, 32] | 0 |

According to the above table, the weight w can be 0.5 when the difference $Diff^{Dir}$ corresponds to 0 to 2, the weight w can be 0.25 when the difference $Diff^{Dir}$ corresponds to 15 to 17, and the weight w can be 0 when the difference $Diff^{Dir}$ corresponds to 30 to 32. This is exemplary and some values may be modified and used.

An enhanced predicted block for the current block can be generated using the (intra-directional) predicted block $Pred^D_{Dir(cur)}$ and the template reference block based on the weight w. The enhanced predicted block may be represented by $Pred^D_{new}$. For example, the enhanced predicted block $Pred^D_{new}$ may be generated using a weighted sum of the intra-directional predicted block $Pred^D_{Dir(cur)}$ and the template reference block.

FIG. 8 shows an example of an enhanced predicted block generation method based on a weighted sum.

Referring to FIG. 8, an enhanced predicted block ($Pred^D_{new}$) 850 according to the present invention can be derived based on a weighted sum of a template reference block A 830 and an intra-directional predicted block ($Pred^D_{Dir(cur)}$) 860. Here, intra-directional predicted block ($Pred^D_{Dir(cur)}$) 860 can be derived based on the intra-directional mode $predMode^D_{dir(cur)}$ of the current block and neighboring reference samples $Ref^D$, as described above.

For example, the template reference block A 830 may be the aforementioned template reconstructed block $Rec^T$. As another example, the template reference block A 830 may be one of the aforementioned template predicted blocks. For example, the template reference block A 830 may be the template predicted block $Pred^T_{Dir(x)}$ selected to calculate the weight W.

Figure 9:
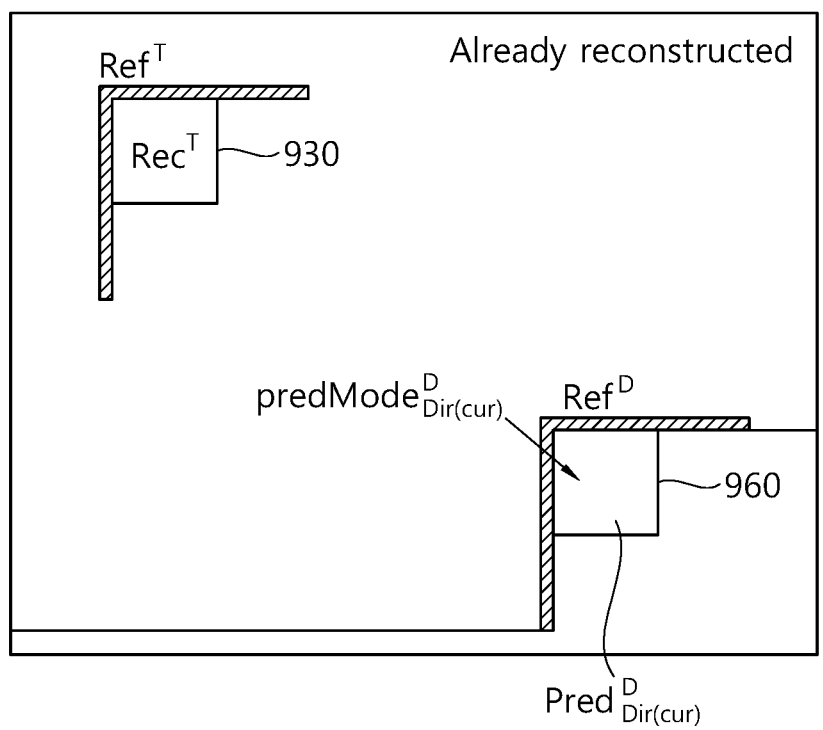
FIG. 9 illustrates an example in which a template reconstructed block $Rec^T$ is used as a template reference block.

FIG. 9 shows an example of using the template reconstructed block $Rec^T$ as a template reference block.

Referring to FIG. 9, a template reconstructed block ($Rec^T$) 930 can be used as a template reference block. Here, the template reconstructed block ($Rec^T$) 930 may be located in a corresponding region surrounded by template reference samples $Ref^T$, as described above. The corresponding region may have the same size as that of the current block. That is, an enhanced predicted block $Pred^D_{new}$ can be generated through a weighted sum of an intra-directional predicted block ($Pred^D_{Dir(cur)}$) 960 for the current block and the template reconstructed block ($Rec^T$) 930 in this case.

FIG. 10 illustrates an enhanced predicted block generation method based on a weighted sum according to an embodiment of the present invention.

Referring to FIG. 10, an enhanced predicted block ($Pred^D_{new}$) 1050 can be generated through a weighted sum of an intra-directional predicted block ($Pred^D_{Dir(cur)}$) 1060 with respect to the current block and a template reconstructed block ($Rec^T$) 1030. In this case, a weight W can be applied to the template reconstructed block ($Rec^T$) 1030 and a weight 1-W can be applied to the intra-directional predicted block ($Pred^D_{Dir(cur)}$) 1060. However, this is exemplary, and the weight W may be applied to the intra-directional predicted block ($Pred^D_{Dir(cur)}$) 1060 and the weight 1-W may be applied to the template reconstructed block ($Rec^T$) 1030.

Figure 11:
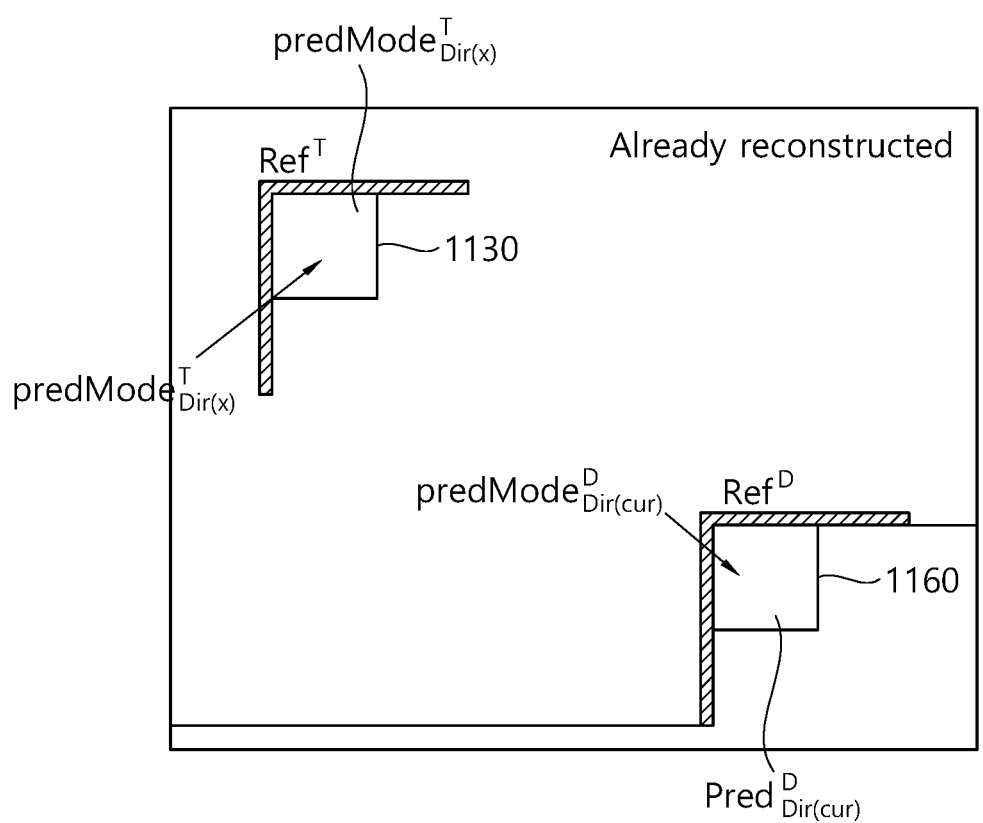
FIG. 11 illustrates an example in which a template predicted block $Pred^T_{Dir(x)}$ is used as a template reference block.

FIG. 11 shows an example of using a template predicted block $Pred^T_{Dir(x)}$ as a template reference block.

Referring to FIG. 11, a template predicted block ($Pred^T_{Dir(x)}$) 1130 can be used as a template reference block. Here, the template predicted block ($Pred^T_{Dir(x)}$) 1130 may be a template predicted block selected for weight calculation from a plurality of template predicted blocks, as described above. In this case, an enhanced predicted block $Pred^D_{new}$ can be generated through a weighted sum of an intra-directional predicted block ($Pred^D_{Dir(cur)}$) 1160 with respect to the current block and the template predicted block ($Pred^T_{Dir(x)}$) 1130.

FIG. 12 illustrates an enhanced predicted block generation method based on a weighted sum according to another embodiment of the present invention.

Referring to FIG. 12, an enhanced predicted block ($Pred^D_{new}$) 1250 can be generated through a weighted sum of an intra-directional predicted block ($Pred^D_{Dir(cur)}$) 1260 with respect to the current block and a template predicted block ($Pred^T_{Dir(x)}$) 1230. In this case, a weight W can be applied to the template predicted block ($Pred^T_{Dir(x)}$) 1230 and a weight 1-W can be applied to the intra-directional predicted block ($Pred^D_{Dir(cur)}$) 1260. However, this is exemplary, and the weight W may be applied to the intra-directional predicted block ($Pred^D_{Dir(cur)}$) 1260 and the weight 1-W may be applied to the template predicted block ($Pred^T_{Dir(x)}$) 1230. Here, each predicted block includes predicted samples, as described above.

The coding apparatus can generate a reconstructed block and a reconstructed picture based on the generated enhanced predicted block. The coding apparatus can generate reconstructed samples for the current block by adding residual samples to predicted samples in the enhanced predicted block and generate a reconstructed block and a reconstructed picture based on the reconstructed samples. In this case, intra-prediction efficiency can be improved to reduce the amount of data of residual signals for the current block and increase coding efficiency.

Meanwhile, when a reference template (i.e., template reference samples $Rec^T$) is detected based on template matching, a corresponding region surrounded by the detected reference template and the current block may overlap. In this case, the considered corresponding region has not been completely reconstructed yet, the above-described methods according to the present invention cannot be applied.

Figure 13:
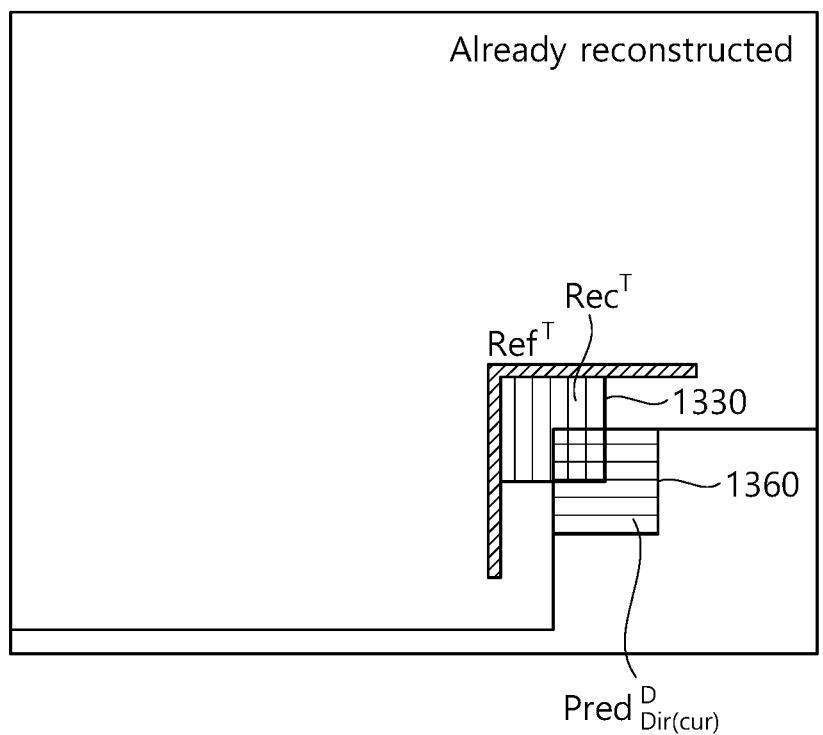
FIG. 13 illustrates an example of a case in which a corresponding region derived through template matching and a current block partially overlap.

FIG. 13 shows an example of a case in which a corresponding region derived through template matching and the current block partially overlap. In FIG. 13, neighboring reference samples $Rec^D$ of the current block 1360 are omitted for description.

Referring to FIG. 13, when template reference samples $Rec^T$ detected through template matching are located close to the current block, a corresponding region 1330 surrounded by the template reference samples $Rec^T$ and the current block 1360 may overlap. In this case, since the overlap region is not a reconstructed region, processing of the overlap region becomes a problem when a template reconstructed block $Rec^T$ and/or a template predicted block $Pred^T_{Dir(x)}$ are derived for weight calculation and/or template reference block derivation as described above.

For example, the template predicted block $Pred^T_{Dir(x)}$ derived based on the template reference samples $Ref^T$ may be composed of a template predicted portion $Pred^{T\text{-}known}_{Dir(x)}$ for a reconstructed region and a template predicted portion $Pred^{T\text{-}unknown}_{Dir(x)}$ for a non-reconstructed region in this case. In this case, since the template reconstructed block $Rec^T$ has only a portion corresponding to the template predicted portion $Pred^{T\text{-}known}_{Dir(x)}$ for the reconstructed region, prediction error due to comparison with the template reconstructed block $Rec^T$ for selecting an optimum $Pred^T_{Dir(x)}$ can be calculated only for the template predicted portion $Pred^{T\text{-}known}_{Dir(x)}$ for the reconstructed region. In this case, how to derive the template predicted portion $Pred^{T\text{-}unknown}_{Dir(x)}$ for the non-reconstructed region overlapping with the current block may become a problem.

Figure 14:
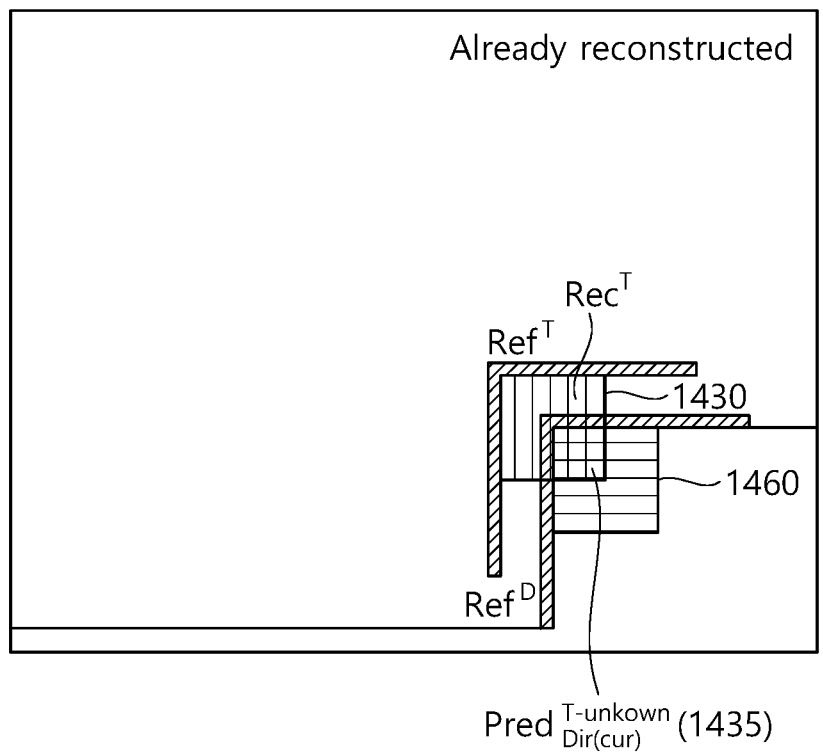
FIG. 14 illustrates a method of deriving a template predicted portion with respect to a non-reconstructed region when a corresponding region derived through template matching and a current block partially overlap.

FIG. 14 illustrates a method for deriving a template predicted portion for a non-reconstructed region when a corresponding region derived through template matching and a current block partially overlap.

Referring to FIG. 14, an overlap region 1435 represents a region in which a corresponding region 1430 derived through template matching and the current block 1460 overlap. Here, $Pred^{T\text{-}unknown}_{Dir(x)}$ for the overlap region 1435 may be derived through a first method of using $predMode^T_{Dir(x)}$ based on template reference samples $Ref^T$. $Pred^{T\text{-}unknown}_{Dir(x)}$ for the overlap region 1435 may be derived through a second method of using $predMode^T_{Dir(x)}$ based on neighboring reference samples $Ref^D$.

Hereinafter, $Pred^{T\text{-}unknown}_{Dir(x)}$ derived using the first method may be represented as $pred^{T1}_{Dir(x)}$ and $Pred^{T\text{-}unknown}_{Dir(x)}$ derived using the second method may be represented as $pred^{T1}_{Dir(x)}$. In this case, the enhanced predicted block $Pred^D_{new}$ can be generated through the following method.

Figure 15:
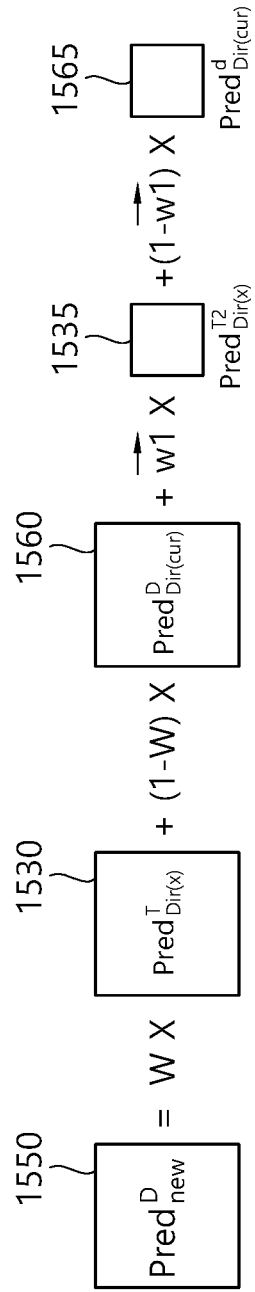
FIG. 15 illustrates an enhanced predicted block generation method based on a weighted sum according to another embodiment of the present invention.

FIG. 15 illustrates an enhanced predicted block generation method based on a weighted sum according to another embodiment of the present invention. FIG. 15 shows a case in which a template predicted block ($Pred^T_{Dir(x)}$) 1530 is used as a template reference block.

Referring to FIG. 15, an enhanced predicted block ($Pred^D_{new}$) 1550 can be generated by adding a weighted sum of $Pred^{T2}_{Dir(x)}$ 1535 for an overlap region and $Pred^d_{Dir(cur)}$ 1565 based on an overlap weight w1 to a weighted sum of an intra-directional predicted block ($pred^D_{Dir(cur)}$) 1560 for the current block and a template predicted block ($Pred^T_{Dir(x)}$) 1530 based on a weight W. Here, $Pred^d_{Dir(cur)}$ 1565 represents a portion of the intra-directional predicted block ($Pred^D_{Dir(cur)}$) 1560 which corresponds to the overlap region.

Figure 16:
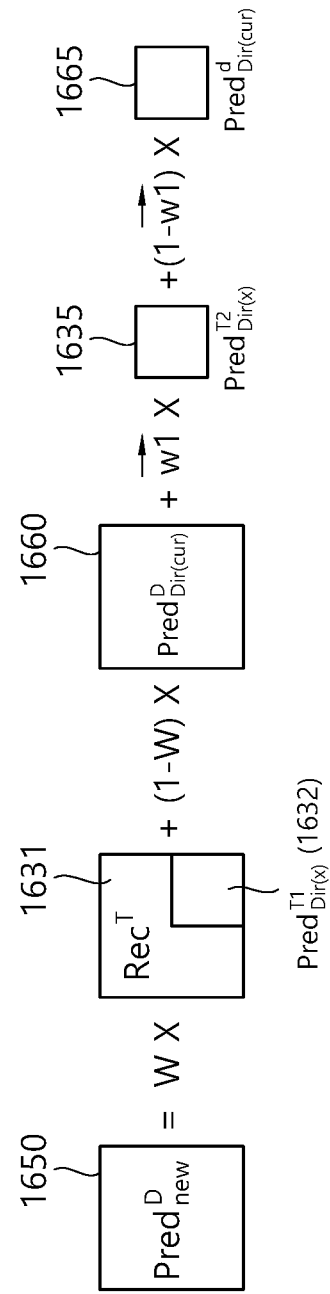
FIG. 16 illustrates an enhanced predicted block generation method based on a weighted sum according to another embodiment of the present invention.

FIG. 16 illustrates an enhanced predicted block generation method based on a weighted sum according to another embodiment of the present invention. In FIG. 16, a template reference block includes a template reconstructed portion (Rec$^T$) 1631 for a portion of a corresponding region other than an overlap region and Pred$^{T1}_{Dir(x)}$ 1632 for the overlap region in the corresponding region.

Referring to FIG. 16, an enhanced predicted block (Pred$^P_{new}$) 1650 can be generated by adding a weighted sum of Pred$^{T1}_{Dir(x)}$ 1635 for the overlap region and Pred$^d_{Dir(cur)}$ 1665 based on an overlap weight w1 to a weighted sum of the template reference block including the template reconstructed portion (Rec$^T$) 1631 for the portion of the corresponding region other than the overlap region and Pred$^{T1}_{Dir(x)}$ 1632 for the overlap region in the corresponding region and an intra-directional predicted block (Pred$^P_{Dir(cur)}$) 1660 for the current block based on a weight W.

The overlap weight w1 for the overlap region may be differentially applied according to intra-prediction direction and sample distance. Here, the intra-prediction direction may include an intra-prediction direction according to predMode$^P_{dir(cur)}$ or predMode$^T_{Dir(x)}$.

Figure 17:
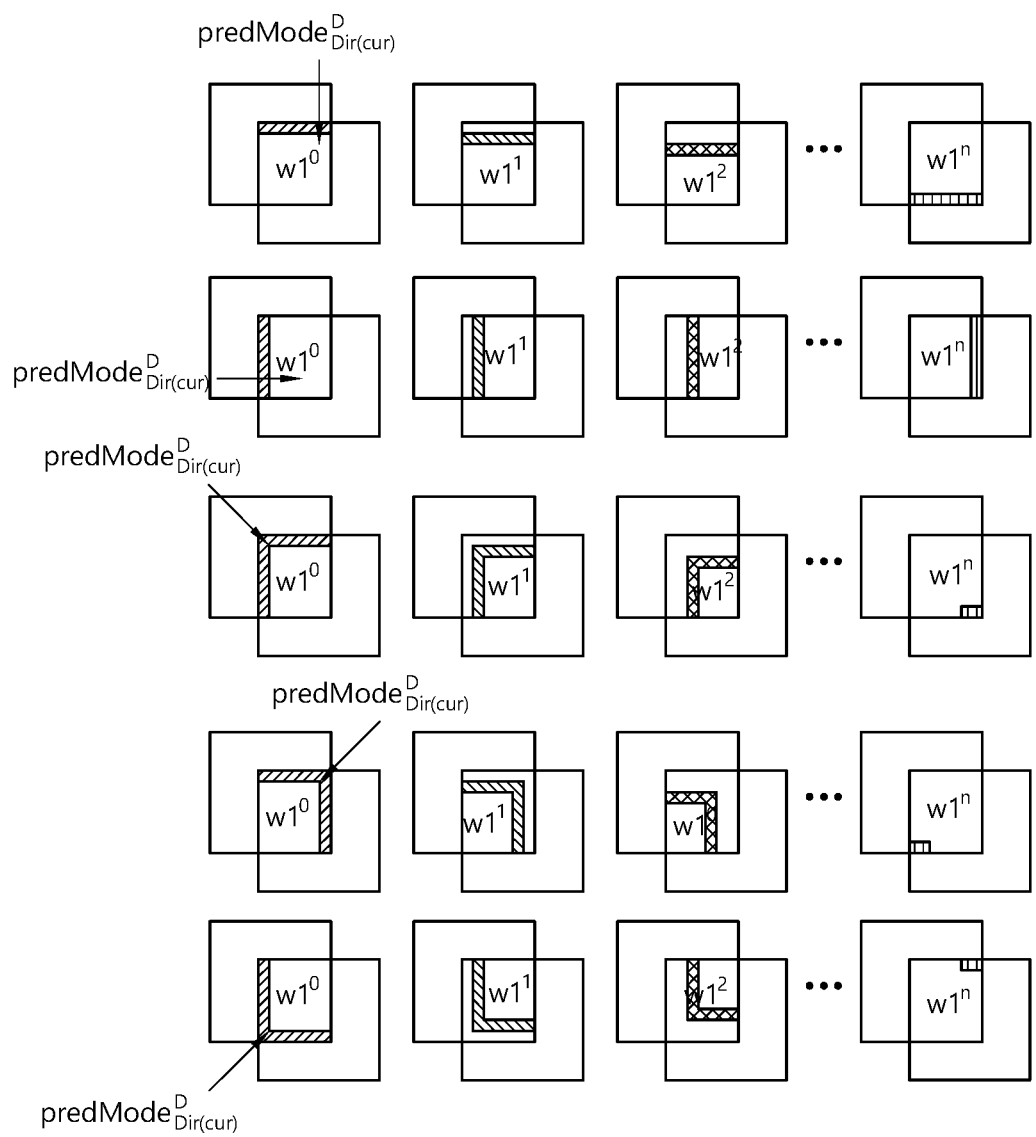
FIG. 17 illustrates an overlap weight w1 according to intra-prediction direction and distance.

FIG. 17 illustrates the overlap weight w1 according to intra-prediction direction and distance.

Referring to FIG. 17, the overlap weight w1 for the overlap region can be differentially derived based on an intra-prediction direction and a distance between a target sample and a reference boundary of the overlap region. For example, the upper boundary of the overlap region can be considered as the reference boundary when the intra-prediction direction is the vertical direction, the left boundary of the overlap region can be considered as the reference boundary when the intra-prediction direction is the horizontal direction, the left boundary and the upper boundary of the overlap region can be considered as the reference boundary when the intra-prediction direction is a left-upward diagonal direction, the upper boundary and the right boundary of the overlap region can be considered as the reference boundary when the intra-prediction direction is a right-upward diagonal direction, and the left boundary and the lower boundary of the overlap region can be considered as the reference boundary when the intra-prediction direction is a left-downward diagonal direction. In this case, the overlap weight w1 can be differentially derived and applied as w1$^0$ to w1$^1$ according to a distance between a target sample in the overlap region and the reference boundary.

Meanwhile, whether the aforementioned combine prediction mode according to the present invention is applied can be signaled through a combine prediction flag. The decoding apparatus can receive and parse the combine prediction flag, and when the combine prediction flag indicates 1, generate an enhanced predicted block for the current block according to the combine prediction mode.

The combine prediction flag can be signaled in the form of cmb_pred_flag syntax element, for example. The combine prediction flag may be included in a CU syntax. When the combine prediction flag is included in the CU syntax, the CU syntax may include the following syntax elements, for example.

TABLE 3

|  | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( CuPredMode[ x0 ][ y0 ] != MODE_INTRA || log2CbSize = = MinCbLog2SizeY ) | |
|       part_mode | ae(v) |
|     if( CuPredMode[ x0 ][ y0 ] = = MODE_INTRA ) { | |
|       if( PartMode = = PART_2Nx2N && pcm_enabled_flag && | |
|         log2CbSize >= Log2MinIpcmCbSizeY && | |
|         log2CbSize <= Log2MaxIpcmCbSizeY ) | |
|         pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( x0, y0, log2CbSize ) | |
|   } else { | |
|     pbOffset = ( PartMode = = PART_NxN ) ? ( nCbS / 2 ) : nCbS | |
|     for( j = 0; j < nCbS; j = j + pbOffset ) | |
|       for( i = 0; i < nCbS; i = i + pbOffset ) { | |
|         prev_intra_luma_pred_flag[ x0 + i ][ y0 + j ] | ae(v) |
|         if( checkNeighorBlock(x0,y0) ) | |
|           cmb_pred_flag[x0 + i][y0 + j] | ae(v) |
|       } | |
|     for( j = 0; j < nCbS; j = j + pbOffset ) | |
|       for( i = 0; i < nCbS; i = i + pbOffset ) | |
|         if( prev_intra_luma_pred_flag[ x0 + i ][ y0 + j ] ) | |
|           mpm_idx[ x0 + i ][ y0 + j ] | ae(v) |
|         else | |
|           rem_intra_luma_pred_mode[ x0 + i ][ y0 + j ] | ae(v) |
|     intra_chroma_pred_mode[ x0 ][ y0 ] | ae(v) |
|     } | |
|   } else { ... } | |

Here, cmb_pred_flag corresponds to the aforementioned combine prediction flag. The decoding apparatus receive and parse the cmb_pred_flag syntax element, and when the cmb_pred_flag syntax element value indicates 1, generate an enhanced predicted block for the current block according to the aforementioned combine prediction mode.

Meanwhile, it is possible to determine whether the combine prediction mode is applied to the current block based on whether the combine prediction mode is applied to neighboring blocks including neighboring reference samples $Ref^D$ of the current block without explicit reception of the combine prediction flag. In Table 3, checkNeighborBlock is a function of checking whether neighboring blocks of the current block have been coded based on the combine prediction mode according to the present invention.

For example, when the combine prediction mode is applied to one, a majority or all of the neighboring blocks, the decoding apparatus can determine that the combine prediction mode is applied to the current block without reception of the combine prediction flag. In this case, however, it may be desirable to determine that the combine prediction mode is applied to the current block when the combine prediction mode is applied to all of the neighboring blocks because template matching is performed based on $Ref^D$ and an intra-prediction direction that will be determined for $Ref^T$ detected based on $Ref^D$ is not known yet, that is, directivity having correlation is not known yet.

The above-described intra-prediction method according to the present invention may be performed based on the flowchart described below, for example. The aforementioned intra-prediction method according to the present invention may also be called a (intra) combine prediction method.

Figure 18:
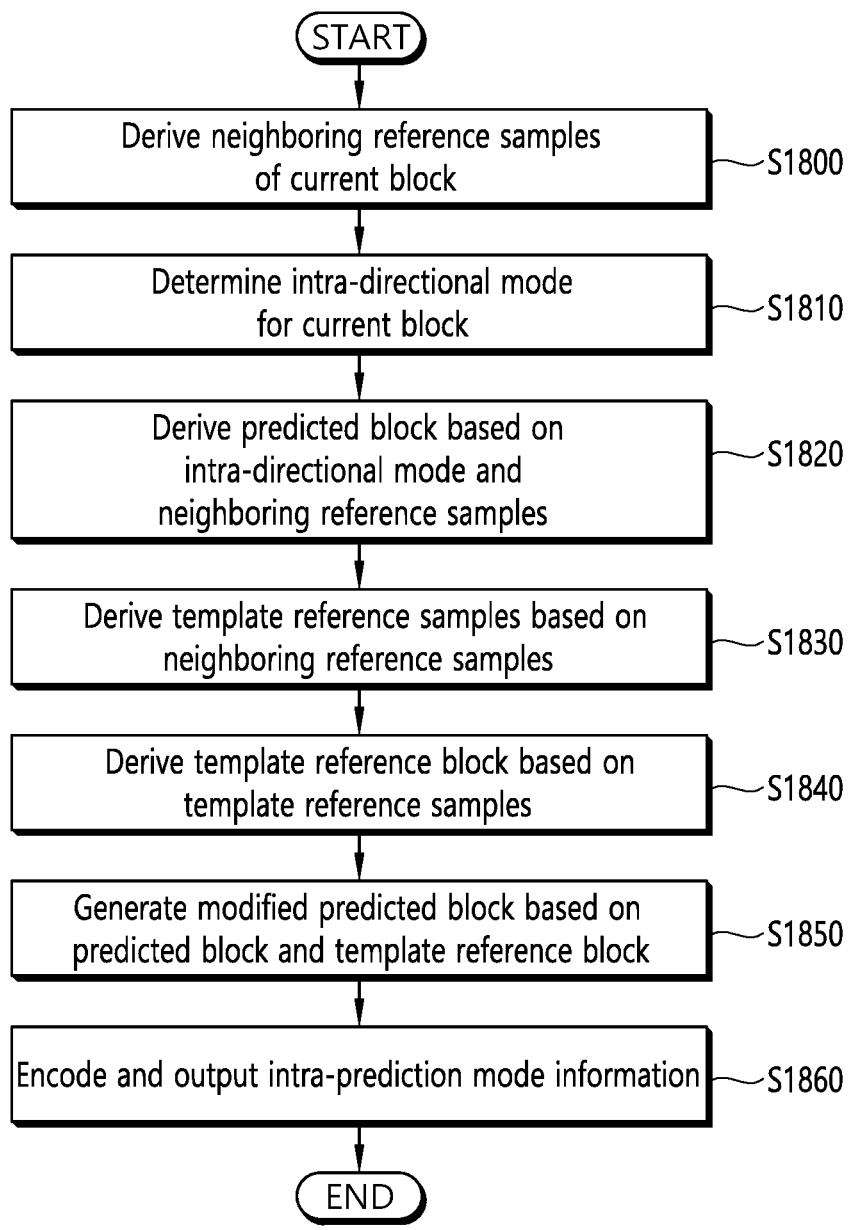
FIG. 18 schematically illustrates an example of an intra-prediction method performed by an encoding apparatus according to the present invention.

FIG. 18 illustrates an example of an intra-prediction method performed by an encoding apparatus according to the present invention. The method shown in FIG. 18 may be performed by the encoding apparatus. Specifically, S1800 to S1850 of FIG. 18 may be performed by a predictor of the encoding apparatus and S1860 may be performed by an entropy encoder of the encoding apparatus.

Referring to FIG. 18, the encoding apparatus derives neighboring reference samples of the current block for intra-prediction (S1800). For example, when the top-left sample position of the current block is regarded as (0, 0), left neighboring samples p[−1][2N−1], . . . ,p[−1][0], a top-left neighboring sample p[−1][−1] and upper neighboring samples p[0][−1], . . . ,p[2N−1][−1] can be derived as neighboring reference samples of the current block for intra-prediction. Here, p[m][n] indicates a sample (or a pixel) at a sample position (m, n) as described above. Here, N can correspond to the width or the height of the current block. When the current block is a transform block, N may be represented as nTbS. If the width of the current block is W and the height thereof is H, left neighboring samples p[−1][2H−1], . . . ,p[−1][0], top-left neighboring sample p[−1][−1] and upper neighboring samples p[0][−1], . . . ,p[2W−1][−1] may be derived as the neighboring reference samples.

The encoding apparatus determines an intra-directional mode for the current block (S1810). Here, the intra-directional mode may be one of intra-angular 2 to intra-angular 34 shown in Table 1. Here, the current block may correspond to a current TU. For example, at least one PU and at least one TU may be derived from a current CU. In this case, one or a plurality of TUs may be present within the PU. For example, an inter/intra-prediction type may be determined in the current CU and a specific intra-directional mode may be determined in the PU. In this case, TUs in the PU region can share the determined intra-directional mode. The encoding apparatus can determine an optimum intra-directional mode based on rate-distortion (RD) cost.

The encoding apparatus derives a predicted block for the current block based on the intra-directional mode and the neighboring reference samples (S1820). The encoding apparatus can derive a predicted value for each target sample of the current block using neighboring reference samples positioned in the prediction direction of the intra-directional mode based on the position of each target sample and generate the predicted block including predicted samples for the current block.

The encoding apparatus derives template reference samples based on the neighboring reference samples (S1830). The encoding apparatus can detect template reference samples most similar to the neighboring reference samples within a reconstructed region of a current picture or a specific region of the reconstructed region.

The encoding apparatus derives a template reference block based on the template reference samples (S1840). The encoding apparatus can derive the template reference block for a corresponding region surrounded by the template reference samples.

For example, when the width and height of the current block are N and the template reference samples include samples p[x0−1][y0+2N−1] to p[x0−1][y0], p[x0−1][y0−1] and p[x0][y0−1] to p[x0+2N−1][y0−1], the corresponding region may be a region having a width N and a height N and having a top-left sample position (x0, y0). As another example, when the width and height of the current block are W and H and the template reference samples include samples p[x0−1][y0+2H−1] to p[x0−1][y0], p[x0−1][y0−1] and p[x0][y0−1] to p[x0+2W−1][y0−1], the corresponding region may be a region having a width of W and a height of H and having a top-left sample position (x0, y0).

The template reference block may be a reconstructed block including reconstructed samples for the corresponding region.

Meanwhile, the encoding apparatus can generate a plurality of template predicted blocks for the corresponding region using a plurality of intra-directional modes based on the template reference samples. The encoding apparatus can select one of the plurality of template predicted blocks, and the template reference block may be the selected template predicted block. The encoding apparatus can select the template predicted block based on comparison between the intra-directional mode for the current block and the intra-directional modes for the template reference blocks.

The encoding apparatus generates a modified predicted block based on the predicted block and the template reference block (S1850). In this case, the encoding apparatus can generate the modified predicted block based on a weighted sum of the predicted block and the template reference block. The modified predicted block may be called an enhanced predicted block.

The encoding apparatus can determine a weight W between the predicted block and the reference block and calculate the weighted sum based on the weight.

The encoding apparatus may determine the weight based on RDO. Alternatively, the encoding apparatus may determine the weight based on a difference between the index of the intra-directional mode for the selected template predicted block and the index of the intra-prediction mode for the current block.

For example, the weight may be determined based on the aforementioned equation 1. An another example, the weight may be determined according to a range to which the difference belongs. Specifically, the weight may be determined based on the aforementioned table 2.

When the weighted sum is calculated, the weight W can be applied to the template reference block and 1-W can be applied to the predicted block. Alternatively, 1-W may be applied to the template reference block and W may be applied to the predicted block.

When an overlap region is present between the corresponding region and the current block, the encoding apparatus can generate a first predicted sub-block for the overlap region based on the intra-directional mode for the selected template predicted block and the neighboring reference samples and generate a second predicted sub-block for the overlap region based on the intra-directional mode for the current block and the neighboring reference samples. In this case, the encoding apparatus can determine an overlap weight between the first predicted sub-block and the second predicted sub-block and generate the modified predicted block further based on a weighted sum of the first predicted sub-block and the second predicted sub-block using the overlap weight.

Further, when the template reference block is a reconstructed block including reconstructed samples for the corresponding region, the encoding apparatus may generate a third predicted sub-block for the overlap region based on the intra-directional mode for the selected template predicted block and the template reference samples, substitute the third predicted sub-block for the overlap region of the template reference block and generate the modified predicted block based on the third predicted sub-block.

The encoding apparatus encodes and outputs intra-prediction mode information representing the intra-directional mode for the current block (S1860). The encoding apparatus can encode the intra-prediction mode information and output the encoded information in the form of a bitstream. The bitstream can be transmitted to a decoding apparatus through a network or a storage medium.

Further, the encoding apparatus can generate a residual block including residual samples for the current block based on the modified predicted block and the original block for the current block. The encoding apparatus may encode residual information about the residual block and output the encoded residual information in the form of a bitstream. The residual information may include quantized transform coefficients with respect to the residual samples for the current block.

Further, the encoding apparatus may encode a combine prediction flag indicating whether the combine prediction mode according to the present invention is applied to the current block and output the encoded combine prediction flag in the form of a bitstream.

Figure 19:
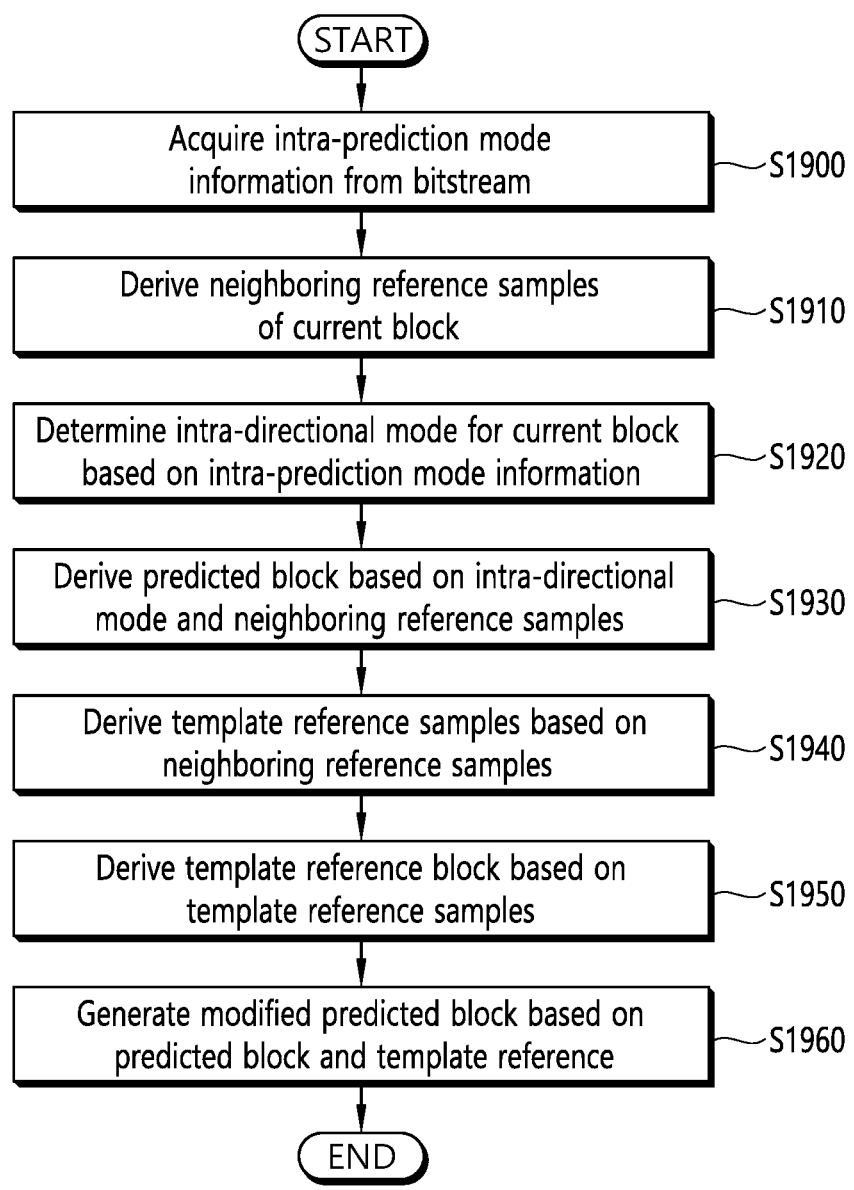
FIG. 19 schematically illustrates an example of an intra-prediction method performed by a decoding apparatus according to the present invention.

FIG. 19 illustrates an intra-prediction method performed by a decoding apparatus according to the present invention. The method shown in FIG. 19 may be performed by the decoding apparatus. Specifically, S1900 may be performed by an entropy decoder of the decoding apparatus and S1910 to S1960 may be performed by a predictor of the decoding apparatus.

Referring to FIG. 19, the decoding apparatus acquires intra-prediction mode information from a bitstream (S1900). The decoding apparatus can decode the bitstream received from an encoding apparatus to acquire the intra-prediction mode information. The bitstream can be received through a network or a storage medium.

The decoding apparatus derives neighboring reference samples of the current block for intra-prediction (S1910).

For example, when the top-left sample position of the current block is regarded as (0, 0), left neighboring samples p[−1][2N−1], . . . ,p[−1][0], a top-left neighboring sample p[−1][−1] and upper neighboring samples p[0][−1], . . . ,p[2N−1][−1] can be derived as neighboring reference samples of the current block for intra-prediction. Here, p[m][n] indicates a sample (or a pixel) at a sample position (m, n) as described above. Here, N can correspond to the width or the height of the current block. When the current block is a transform block, N may be represented as nTbS. If the width of the current block is W and the height thereof is H, left neighboring samples p[−1][2H−1], . . . ,p[−1][0], top-left neighboring sample p[−1][−1] and upper neighboring samples p[0][−1], . . . ,p[2 W−1][−1] may be derived as the neighboring reference samples.

The decoding apparatus determines an intra-directional mode for the current block based on the intra-prediction mode information (S1920). Here, the intra-directional mode may be one of intra-angular 2 to intra-angular 34 shown in Table 1. Here, the current block may correspond to a current TU. For example, at least one PU and at least one TU may be derived from a current CU. In this case, one or a plurality of TUs may be present within the PU. For example, an inter/intra-prediction type may be determined in the current CU and a specific intra-directional mode may be determined in the PU. In this case, TUs in the PU region can share the determined intra-directional mode.

The decoding apparatus can determine the intra-directional mode according to whether a most probable mode (MPM) or a remaining mode is applied. When the MPM is applied, the decoding apparatus can determine an MPM list based on the intra-prediction mode for the left or upper neighboring block of the PU and determine the intra-prediction mode based on the MPM list. In this case, the decoding apparatus can acquire an MPM index from the bitstream and derive a candidate intra-directional mode indicated by the MPM index among candidates in the MPM list as the intra-directional mode of the current block. When the remaining mode is applied, the decoding apparatus can acquire information indicating a specific intra-prediction mode among remaining modes that are not included in the MPM list from the bitstream and derive the intra-directional mode of the current block based on the information indicating the specific intra-prediction mode.

The decoding apparatus derives a predicted block for the current block based on the intra-directional mode and the neighboring reference samples (S1930). The decoding apparatus can derive a predicted value for each target sample of the current block using neighboring reference samples positioned in the prediction direction of the intra-directional mode based on the position of each target sample and generate the predicted block including predicted samples for the current block.

The decoding apparatus derive template reference samples based on the neighboring reference samples (S1940). The decoding apparatus can detect template reference samples most similar to the neighboring reference samples within a reconstructed region of a current picture or a specific region of the reconstructed region. Alternatively, the decoding apparatus may acquire position information representing a positional relationship between the neighboring reference samples and the template reference samples from the bitstream.

The decoding apparatus derives a template reference block based on the template reference samples (S1950). The decoding apparatus can derive the template reference block for a corresponding region surrounded by the template reference samples.

For example, when the width and height of the current block are N and the template reference samples include samples p[x0−1][y0+2N−1] to p[x0−1][y0], p[x0−1][y0−1] and p[x0][y0−1] to p[x0+2N−1][y0−1], the corresponding region may be a region having a width and height of N and a top-left sample position of (x0, y0). As another example, when the width and height of the current block are W and H and the template reference samples include samples p[x0−1][y0+2H−1] to p[x0−1][y0], p[x0−1][y0−1] and p[x0][y0−1] to p[x0+2 W−1][y0−1], the corresponding region may be a region having a width of W, a height of a H and a top-left sample position of (x0, y0).

The template reference block may be a reconstructed block including reconstructed samples for the corresponding region.

Meanwhile, the decoding apparatus can generate a plurality of template predicted blocks for the corresponding region using a plurality of intra-directional modes based on the template reference samples. The decoding apparatus can select one of the plurality of template predicted blocks, and the template reference block may be the selected template predicted block. The decoding apparatus can select the template predicted block based on comparison between the intra-directional mode for the current block and the intra-directional modes for the template reference blocks.

The decoding apparatus generates a modified predicted block based on the predicted block and the template reference block (S1960). In this case, the decoding apparatus can generate the modified predicted block based on a weighted sum of the predicted block and the template reference block. The modified predicted block may be called an enhanced predicted block.

The decoding apparatus can determine a weight W between the predicted block and the reference block and calculate the weighted sum based on the weight.

The decoding apparatus can acquire information about the weight from the bitstream. Alternatively, the decoding apparatus determine the weight based on a difference between the index of the intra-directional mode for the selected template predicted block and the index of the intra-prediction mode for the current block.

For example, the weight may be determined based on the aforementioned equation 1. An another example, the weight may be determined according to a range including the difference. Specifically, the weight may be determined based on the aforementioned table 2.

When the weighted sum is calculated, the weight W can be applied to the template reference block and 1-W can be applied to the predicted block. Alternatively, 1-W may be applied to the template reference block and W may be applied to the predicted block.

When an overlap region between the corresponding region and the current block is present, the decoding apparatus can generate a first predicted sub-block for the overlap region based on the intra-directional mode for the selected template predicted block and the neighboring reference samples and generate a second predicted sub-block for the overlap region based on the intra-directional mode for the current block and the neighboring reference samples. In this case, the decoding apparatus can determine an overlap weight between the first predicted sub-block and the second predicted sub-block and generate the modified predicted block based on a weighted sum of the first predicted sub-block and the second predicted sub-block using the overlap weight. The overlap weight can be differentially applied in unit of sample according to the intra-prediction direction for the current block or the selected template predicted block and a distance from the reference boundary of the overlap region.

Further, when the template reference block is a reconstructed block including reconstructed samples for the corresponding region, the decoding apparatus may generate a third predicted sub-block for the overlap region based on the intra-directional mode for the selected template predicted block and the template reference samples, substitute the third predicted sub-block for the overlap region of the template reference block and generate the modified predicted block based on the third predicted sub-block.

The decoding apparatus can acquire residual information from the bitstream and derive a residual block for the current block based on the residual information. The residual block includes residual samples. The decoding apparatus can generate a reconstructed block and a reconstructed picture based on the modified predicted block and the residual block.

Further, the decoding apparatus can acquire a combine prediction flag indicating whether the combine prediction mode according to the present invention is applied to the current block from the bitstream, and when the combine prediction flag value indicates 1, perform derivation of the template reference samples, derivation of the template reference block and generation of the modified predicted block. The decoding apparatus may determine whether the combine prediction mode is applied to the current block based on whether the combine prediction mode is applied to neighboring blocks including the neighboring reference samples without explicit reception of the combine prediction flag.

According to the above-described present invention, it is possible to generate a modified predicted block based on an intra-predicted block and a template reference block to improve intra-prediction performance.

According to the present invention, it is possible to adaptively determine a weight between the intra-predicted block and the template reference block based on comparison between the intra-directional mode of the template predicted block and the intra-directional mode of the current block.

Furthermore, according to the present invention, it is possible to improve intra-prediction performance while minimizing transmission of additional auxiliary information, enhancing coding efficiency.

The above description is only illustrative of the technical concept of the present invention. Therefore, those skilled in the art may make various modifications and variations to the above description without departing from the essential features of the present invention. Accordingly, the embodiments disclosed herein are intended to be illustrative, not limiting, of the present invention. The scope of the present invention is not limited by these embodiments. The scope of protection of the present invention should be construed according to the following claims.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An intra-prediction method performed by a decoding apparatus, comprising:
   acquiring intra-prediction mode information from a bitstream;
   deriving neighboring reference samples of a current block;
   determining an intra-directional mode for the current block based on the intra-prediction mode information;
   deriving a predicted block for the current block based on the intra-directional mode and the neighboring reference samples;
   deriving template reference samples based on the neighboring reference samples;
   deriving a template reference block based on the template reference samples;
   determining a weight between the predicted block and the template reference block;
   generating a modified predicted block based on the predicted block and the template reference block,
   wherein the modified predicted block is generated based on a weighted sum of the predicted block and the template reference block based on the weight;
   generating a plurality of template predicted blocks for a corresponding region using a plurality of intra-directional modes based on the template reference samples; and
   selecting one of the plurality of template predicted blocks,
   wherein the weight is determined based on a difference between the index of an intra-directional mode for the selected template predicted block and the index of the intra-directional mode for the current block.

2. The intra-prediction method of claim 1, wherein, when the template reference samples include samples p[x0−1][y0+2N−1] to p[x0−1][y0], p[x0−1][y0−1] and p[x0][y0−1] to p[x0+2N−1][y0−1], the corresponding region is a region having a width N and a height N and having a top-left sample position (x0, y0), wherein p[m][n] represents a sample at a sample position (m, n).

3. The intra-prediction method of claim 1, wherein the weight is determined based on the following equation, $$W = \frac{\frac{1}{2}}{Diff^{dir} + 1}$$

wherein W represents the weight and $Diff^{dir}$ represents the difference.

4. The intra-prediction method of claim 1, wherein the weight is determined according to a range to which the difference belongs.

5. The intra-prediction method of claim 3, wherein the weight is determined based on the following table,

| $Diff^{dir}$ | w |
|---|---|
| [0, 1, 2] | 0.5 |
| [3, 4, 5] | 0.45 |
| [6, 7, 8] | 0.4 |
| [9, 10, 11] | 0.35 |
| [12, 13, 14] | 0.3 |
| [15, 16, 17] | 0.25 |
| [18, 19, 20] | 0.2 |
| [21, 22, 23] | 0.15 |
| [24, 25, 26] | 0.1 |
| [27, 28, 29] | 0.05 |
| [30, 31, 32] | 0 | wherein $Diff^{dir}$ represents the difference and W represents the weight.

6. The intra-prediction method of claim 1, wherein W is applied to the template reference block and 1-W is applied to the predicted block when the weighted sum is calculated, W representing the weight.

7. The intra-prediction method of claim 1, wherein the template reference block is a reconstructed block including reconstructed samples for the corresponding region.

8. The intra-prediction method of claim 1, wherein the template reference block is the selected template predicted block.

9. The intra-prediction method of claim 1, further comprising acquiring a combine prediction flag from the bitstream,
   wherein derivation of the template reference samples, derivation of the template reference block and generation of the modified predicted block are performed when the combine prediction flag indicates 1.

10. The intra-prediction method of claim 1, further comprising:
    generating a first predicted sub-block for an overlap region based on an intra-directional mode for the selected template predicted block and the neighboring reference samples and generating a second predicted sub-block for an overlap region based on the intra-directional mode for the current block and the neighboring reference samples when the overlap region is preset between the corresponding region and the current block; and
    determining an overlap weight between the first predicted sub-block and the second predicted sub-block,
    wherein the modified predicted block is generated further based on the first predicted sub-block and the second predicted sub-block using the overlap weight.

11. The intra-prediction method of claim 10, further comprising generating a third predicted sub-block for the overlap region based on the intra-directional mode for the selected template predicted block and the template reference samples when the template reference block is a reconstructed block including reconstructed samples for the corresponding region,
    wherein the third predicted sub-block substitutes for the overlap region of the template reference block.

12. An intra-prediction method performed by an encoding apparatus, comprising:
    deriving neighboring reference samples of a current block;
    determining an intra-directional mode for the current block;
    deriving a predicted block for the current block based on the intra-directional mode and the neighboring reference samples;
    deriving template reference samples based on the neighboring reference samples;

deriving a template reference block based on the template reference samples;
determining a weight between the predicted block and the template reference block;
generating a modified predicted block based on the predicted block and the template reference block,
wherein the modified predicted block is generated based on a weighted sum of the predicted block and the template reference block based on the weight;
generating a plurality of template predicted blocks for a corresponding region using a plurality of intra-directional modes based on the template reference samples;
selecting one of the plurality of template predicted blocks,
wherein the weight is determined based on a difference between the index of an intra-directional mode for the selected template predicted block and the index of the intra-directional mode for the current block; and
encoding intra-prediction mode information representing the intra-directional mode for the current block and outputting the intra-prediction mode information.

* * * * *